United States Patent [19]
Bridges et al.

[11] Patent Number: 5,959,447
[45] Date of Patent: Sep. 28, 1999

[54] NON-CONTACT MEASUREMENT OF ELECTRICAL WAVEFORMS ON THE SURFACE OF A SAMPLE USING TIME DOMAIN GATING

[75] Inventors: Greg E. Bridges; Ra'a A. Said; Douglas J. Thomson, all of Winnipeg, Canada

[73] Assignee: Micron Force Instruments, Inc., San Jose, Calif.

[21] Appl. No.: 09/020,173

[22] Filed: Feb. 6, 1998

Related U.S. Application Data

[60] Provisional application No. 60/063,171, Oct. 24, 1997.

[51] Int. Cl.$^6$ ..................................................... G01B 5/28
[52] U.S. Cl. ........................... 324/7.62; 324/72; 324/458; 324/456; 250/305
[58] Field of Search ............................. 250/305; 324/72, 324/96, 458, 456, 762

[56] References Cited

U.S. PATENT DOCUMENTS

| | | | |
|---|---|---|---|
| 4,928,057 | 5/1990 | Williams | 324/106 |
| 4,992,728 | 2/1991 | McCord et al. . | |
| 5,065,103 | 11/1991 | Slinkman | 324/458 |
| 5,381,101 | 1/1995 | Bloom et al. . | |
| 5,442,300 | 8/1995 | Nees | 324/96 |
| 5,488,305 | 1/1996 | Bloom et al. . | |

OTHER PUBLICATIONS

G.E. Bridges, et al., "Novel Near–Field Probe for On–Wafer Integrated Circuit Measurements," Microelectronics J, vol. 23(5), Jan. 1992.

G.E. Bridges, et al., "High–Frequency Pattern Extraction in Digital Integrated Circuits Using Scanning Electrostatic Force Microscopy," J. Vac. Sci. Technol. B, vol. 13(3), May/Jun., 1995.

A. Leyk, et al., "104GHz Signals Measured by High Frequency Scanning Force Microscope Test System," Electronics Letters, Apr., 1995.

C. Bohm, et al., "Contactless Electrical Characterization of MMICs by Device Internal Electrical Sampling Scanning–Force–Microscopy," IEEE MTT–S Digest, Jan. 1994.

C. Bohm, et al., "Scanning–Force–Micrscope Test System for Device Internal Test with High Spatial and Temporal Resolution," Microelectron. Eng., vol. 24, Jan. 1994.

A.S. Hou, et al., "Scanning Probe Microscopy for Testing Ultrafast Electronic Devices," Optical and Quantum Electronics, vol. 28, Jan. 1996.

(List continued on next page.)

*Primary Examiner*—Josie Ballato
*Assistant Examiner*—Jose M. Solis
*Attorney, Agent, or Firm*—Blakely, Sokoloff, Taylor & Zafman, LLP

[57] ABSTRACT

A method and an apparatus for providing non-contact measurement of waveforms proximate to a surface of a sample. In one version, the describe apparatus includes a probe waveform generator that generates probe waveforms with the same repetition rate as a sample waveform to the measured from the sample. The apparatus includes a cantilever with a signal path to carry the probe waveform to a position above the sample surface where the sample waveform is to be measured. The apparatus of the present invention also includes a gate to periodically route the probe waveforms to the cantilever tip. The gate is controlled by a periodic gating signal with a period substantially longer than the signal period of the sample waveform. In one version, the gate is switched at a repetition rate substantially equal to a mechanical resonant repetition rate of the cantilever. Capacitive coupling between the cantilever and the signal line of the sample results in a periodic motion of the cantilever at the gating repetition rate. The periodic mechanical motion may be measured and the electrical waveform flowing in the signal line in the sample is determined. By adjusting the time delay of the pulse waveform impressed upon the tip of the cantilever, the amplitude of the sample waveform can be measured with the present invention during various portion of each cycle of the sample waveform.

38 Claims, 11 Drawing Sheets

OTHER PUBLICATIONS

B.A. Nechay, et al., "Applications of an Atomic Force Microscope Voltage Probe with Ultrafast Time Resolution," J. Vac. Sci. Technol. B, vol. 13(3), May/Jun., 1995.

F. Ho, et al., "High–Speed Integrated Circuit Probing Using a Scanning Force Microscope Sampler," Electronics Letters, vol. 30(7), Mar., 1994..

E.W. Strid and T. Burchman, "Wideband Probing Techniques for Planar Devices," Solid State Tech., Aug. 1989.

J. Kim, et al., Photoconductive Sampling Probe with 2–3 ps Temporal Resolution and 4–\mu V Sensitivity, Appl. Phys. Lett., vol. 62, May 1993.

P. G. May, et al., "Noncontact High–Speed Waveform Measurements with the Picosecond Photoelectron Scanning Electron Microscope," IEEE J. Quantum Electron., vol. 24, Feb. 1988.

H.K. Wickramasinghe, "Scanned–Probe Microscopes," Sci. Am., pp. 98–105, Oct. 1989.

Y.A. Martin, et al., "High–Resolution Capacitance Measurement and Potentiometry by Force Microscopy," Appl. Phys. Lett., vol. 52, Mar. 1988.

J.M.R. Weaver, and David W. Abraham, "High Resolution Atomic Force Microscopy Potentiometry," J. Vac. Sci. Technol. B., vol. 9, May/Jun. 1991.

R.A. Said, et al., "Noninvasive Scanned Probe Potentiometry for Integrated Circuit Diagnostics," IEEE Trans. Instrum. Measure, vol. 43, Jun. 1994.

A.S. Hou, et al., "Picosecond Electrical Sampling Using a Scanning Force Microscopy," Electron. Lett., vol. 28, Dec. 1992.

G.E. Bridges, et al., "Heterodyne Electrostatic Force Microscopy for Non–contact High Frequency Integrated Circuit Measurement," Electron Lett, vol. 29, Aug. 1993.

R.A. Said, et al., "Scanned Electrostatic Force Microscope for Noninvasive High Frequency Potential Measurement," Appl. Phys. Lett., vol. 64, Mar. 1994.

C. Bohm, et al., "Voltage Contrast in Integrated Circuits with 100nm Spatial Resolution by Scanning Force Microscopy," J. Phys. D.: Appl. Phys. vol. 25, 1993. (no month).

D.M. Bloom, "Voltage–Contrast Scanning Probe Microscopy," Microelectronic Engineering, vol. 24, 1994. (no month).

G.E. Bridges, et al., "Sampled Waveform Measurement in Integrated Circuits Using Heterodyne Electrostatic Force Microscopy," Rev. Sci Instrum., vol. 65, Nov. 1994.

G.E. Bridges, & D.J. Thomson, "High–Frequency Circuit Characterization using the AFM as a Reactive Near–Field Probe," J. Ultramicroscopy, vol. 42, Jan. 1992.

K. Domaniski, et al., "Mapping of Mobile Charges on Insulator Surfaces with the Electrostatic Force Microscope," Appl. Phys. Lett., vol. 63, Sep. 1993.

R.A. Said, Scanning Force Potentiometry Techniques for Semiconductor Circuit Characterization, Thesis, Dept. of Elect. & Comp. Eng., Univ. of Manitoba, Canada, Jan. 1995.

D. Noruttun, Non–Contact Internal Probing of High Speed Microelectronic Circuits Using Electrostatic Force Microscopy, Thesis, Dept. of Elect. & Comp. Eng., Univ. of Manitoba, Canada, Jan. 1997.

"Advanced Electro–optic Sampling Permits Non–invasive Testing of IC Performance," Electronic Engineering, Feb. 1989.

S.S. Osofsky, "Design and Performance of a Non–Contacting Probe for Measurements on High–Frequency Planar Circuits," IEEE Trans on Microwave Theory and Tech., vol. 40, Aug. 1992.

M. Nonnenmacher, et al., "Kelvin Probe Force Microscopy," Appl. Phys. Lett., vol. 58, Jun. 1991.

R. Said and G. Bridges, "Heterodyne Electrostatic Force Microscopy Used as a New Non–Contact Test Technique for Integrated Circuits," Dept. of Electrical and Computer Engineering, U. of Manitoba, Canada, Jan. 1995.

R. Said, et al., High Frequency Potential Probe Using Electrostatic Force Microscopy, J. Vac. Sci. Technol. A vol. 12(4), Jul./Aug. 1994.

NON-CONTACT MEASUREMENT OF ELECTRICAL WAVEFORMS ON THE SURFACE OF A SAMPLE USING TIME DOMAIN GATING

RELATED APPLICATIONS

This application claims priority to U.S. provisional application serial No. 60/063,171, filed Oct. 24, 1997, entitled "Non Contact Measurement Of Electrical Waveforms On The Surface Of A Sample Using Time Domain Gating."

BACKGROUND OF THE INVENTION

1. Field of the Invention

The present invention relates generally to waveform measurements and, more specifically, the present invention relates to the measurement of electrical waveforms proximate to the surface of a sample such as for example an integrated circuit.

2. Background Information

The microelectronics field is a multi-billion dollar industry that is driving rapid technological advances in the fabrication of dense high frequency integrated circuits. Within this industry there is a continuing effort to increase integrated circuit speed as well as device density. The continuing technological advances create major challenges for researches in the test and measurement field. For instance, the ability to measure the internal signals of a circuit is often important in order to perform design test, diagnostics and failure analysis of advanced microelectronics. High spatial and temporal resolution, non-invasiveness, and accuracy are among the desirable characteristics of a suitable measurement instrument. As circuit operating frequencies continue to increase and as device dimensions continue to decrease, these desirable characteristics of measurement instruments become increasingly difficult to achieve.

Present day measurement and probing methods based on direct physical contact of internal signal lines of a chip are often not suitable for internal testing of many circuits due to probe contact area, spatial limitations and/or the parasitic loading caused by the probe. Other disadvantages associated with probing methods based on direct physical contact of internal signal lines of a chip include circumstances where test points are not readily accessible, the electrical contacts of the test points are unreliable, the direct contact probe tip sizes are excessive in size and the removal of passivation layers are necessary to expose the test points.

Several non-contact measurement techniques, however, have been developed as alternatives to direct contact probing. Among the non-contact measurement techniques are electro-optic probing, opto-electronic sampling, reactive near-field probing, high-speed photoemission sampling, and electron-beam testing. Several of these methods are capable of providing very high spatial and/or temporal resolution. However, these methods rely on measuring a secondary effect of the local circuit potential, that require complex calibration procedures thereby making accurate voltage measurements difficult and in some cases impossible. Furthermore, many of the above-listed instruments also require very specialized operating environment. For example, electron-beam testing must be performed in a vacuum.

In the last decade, several new measurement techniques based on scanning force have been utilized for non-contact measurements. One of the instruments that use the new measurement techniques is the electrostatic force microscope (EFM), which is capable of measuring static or low frequency voltages on integrated circuits with very high spatial resolution. An advantage of the EFM approach is that it is simple and can be performed in air over passivated circuits. Until very recently, however, the technique has been limited to measuring only signals at repetition rates at, near or below the mechanical response of the probe, which is typically less than 100 KHz. As can be appreciated, many microelectronic measurement applications require higher frequency measurement capabilities in order to be useful.

A number of new techniques have been proposed to overcome the frequency limitations of the EFM. These new techniques have been used with varying degrees of success in proposed non-contact probing instruments that are able to perform both high speed digital signal and high frequency vector analog signal measurements. However, a number of difficulties and disadvantages still remain with the proposed probing instruments. For instance, accurate voltage measurements require precise probe positioning and calibration at every measurement location. The proposed probing instruments are subject to non-repetitive direct current (DC) voltage offset effects. Long bit pattern measurements are subject to signal-to-noise reduction. The equivalent-time bandwidth is limited at high frequencies due to probe mechanical frequency response and is subject to noise at low frequencies. Furthermore, the proposed techniques require expensive equipment and/or electronic components to implement or are band limited due to the unavailability of wide band components. Moreover, the need for calibration makes it difficult to use some of the above-listed methods for passivated circuits.

Therefore, what is desired is a method and an apparatus for providing measurement of electrical waveforms from a sample such as for example an integrated circuit. Such a method and apparatus should measure the electric signals from the surface of the sample without coming in direct physical contact with the sample. In addition, such a method and apparatus should provide measurement of high frequency signals without the need for expensive equipment and/or electronic components to implement.

SUMMARY OF THE INVENTION

A method and an apparatus for measuring an electrical waveform is disclosed. In one embodiment, the disclosed measurement apparatus is utilized for measuring a sample waveform in a signal line proximate to a surface of a sample. The apparatus includes a cantilever having a tip disposed near and spaced apart from the surface of the sample such that the tip of the cantilever is capacitively coupled to the signal line. A first probe waveform generator generates a first probe waveform that has a frequency or a repetition rate that is substantially equal to the repetition rate of the sample waveform. A probe waveform gate is coupled between the probe waveform generator and the tip of cantilever. The probe waveform gate alternatingly couples the first probe waveform to the cantilever through a signal path in response to a gate control signal. The gate control signal switches the probe waveform gate at a repetition rate substantially less than the repetition rate of the sample waveform. A motion detector is coupled to the cantilever and measures the sample waveform by detecting a motion of the cantilever. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for measuring a sample waveform in a signal line proximate to a surface of a sample is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention is an apparatus for measuring a periodic electrical signal waveform on or near the surface of a sample such as an integrated circuit. In one embodiment, the apparatus includes a probe waveform generator that generates probe waveforms with the same repetition rate, or frequency, as the sample electrical waveform to be measured in the sample. In one embodiment, the probe waveform is an electrical pulse train.

The presently described apparatus also includes a cantilever that carries probe signals to a tip of the cantilever positioned above the sample surface where the sample signal to be measured is carried by signal line. The presently described apparatus also includes a probe waveform gate that periodically routes the probe signal to the tip of the cantilever. The probe gate is controlled by a periodic gating signal with a period much longer than the sample signal period. In one embodiment, the periodic gating signal that controls the probe gate has a repetition rate substantially equal to the mechanical resonance frequency of the cantilever as this repetition rate provides an improved response.

Capacitive coupling between the cantilever and the signal line causes a periodic mechanical motion in the cantilever at a number of repetition rates including DC, the probe gating repetition rate, and/or multiples thereof. In one embodiment, the periodic mechanical motion of the cantilever is measured at the probe gating repetition rate and the electrical sample waveform carried by the signal line beneath the cantilever is measured accordingly. In another embodiment, the resonant frequency may be measured using known techniques to measure the sample waveform in accordance with the teachings of the present invention.

In an embodiment where the probe waveform is an electrical pulse train, the mechanical motion of the cantilever will be approximately proportional to the magnitude of the electrical waveform carried in the signal line under the tip of the cantilever at the time when the pulse of the probe signal arrives at the tip of the cantilever. By varying the time at which the pulse of the probe signal arrives at the end of the cantilever by adjusting the time delay or phase of the probe waveform, the amplitude of the electrical sample signal over the entire sample waveform period can be measured.

Figure 1:
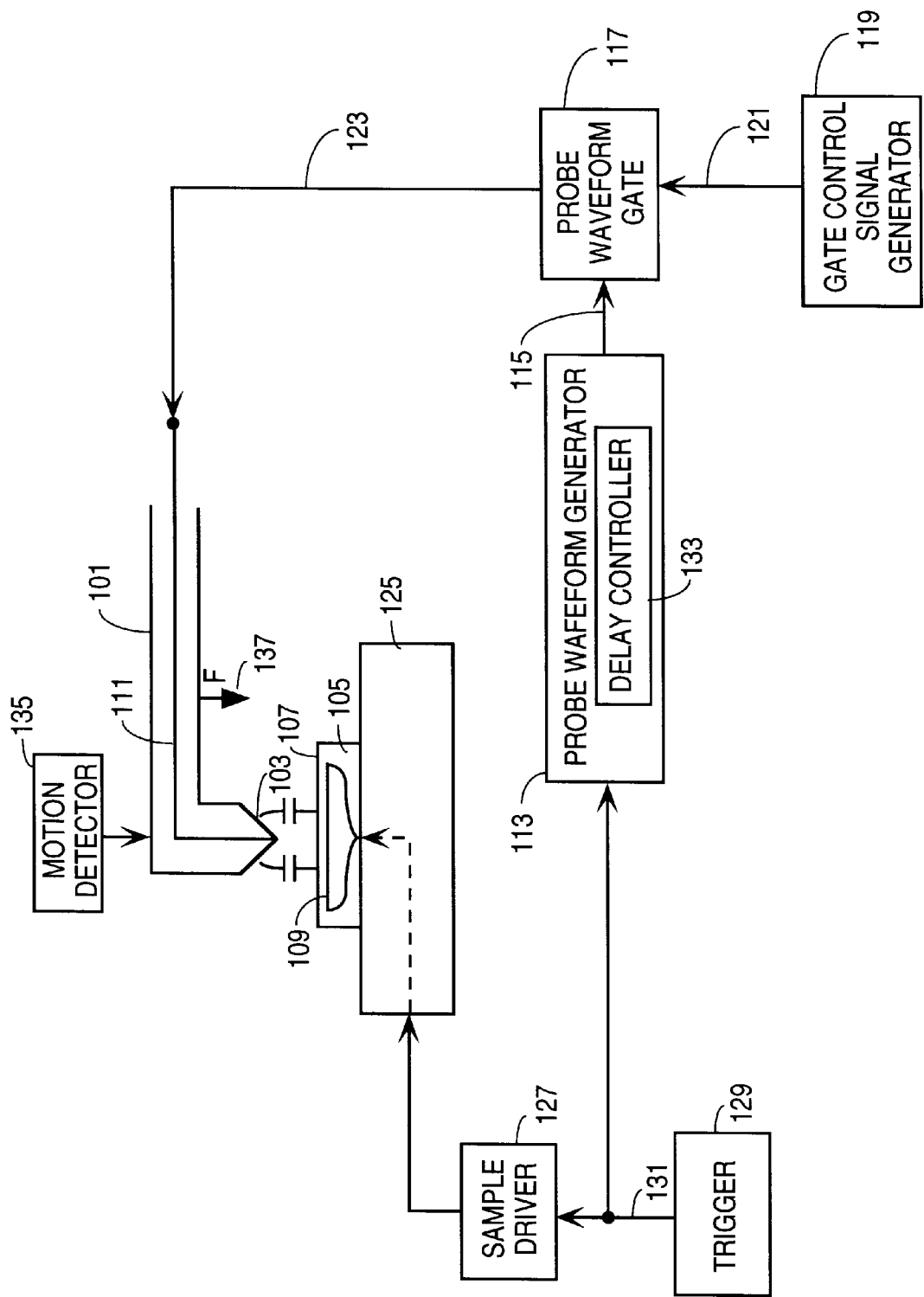
FIG. 1 is a block diagram of one embodiment of a non-contact waveform measurement apparatus in accordance with the teachings of the present invention.

FIG. 1 is a block diagram of one embodiment of a non-contact waveform measurement apparatus in accordance with the teachings of the present invention. As illustrated in FIG. 1, a cantilever 101 having a tip 103 is disposed near and spaced apart from a surface 107 of a sample 105. In one embodiment, cantilever 101 is free at the end of tip 103 and is fixed at the other end. In one embodiment, cantilever 101 may be constructed from a wire or a micromachined beam.

In one embodiment, sample 105 is mounted on a stage 125. A sample driver 127 drives a periodic sample waveform through a signal line 109, which in one embodiment is proximate to surface 107 of sample 105. In one embodiment, signal line 109 may be a metal interconnect existing within the dielectric isolation layer of an integrated circuit die. Although tip 103 of cantilever 101 does not come in direct contact with surface 107, tip 103 is capacitively coupled to signal line 109.

For purposes of this disclosure, it is appreciated that a signal line encompasses any element carrying an electrical sample waveform to be measured. This includes, but is not limited to actual circuit devices, or portions thereof. Therefore, periodic sample waveforms may also be measured from the gates of transistors in accordance with the teachings of the present invention.

Trigger 129 generates a trigger 131, which is used by sample driver 127 when driving the sample waveform in signal line 109. In one embodiment, sample driver 127 and trigger 129 are included in a tester, such as for example automated testing equipment (ATE). In one embodiment, sample driver 127 drives a set of N-bit long test vectors to the pins (not shown) of sample 105 to drive the sample waveform that is carried in signal line 109.

In one embodiment, a probe waveform generator 113 generates a probe waveform 115, which is coupled to a probe waveform gate 117. In one embodiment, probe waveform gate 117 periodically couples probe waveform 115 to tip 103 of cantilever 101 through a signal path 111 such that a probe signal 123 is received at tip 103. Probe waveform gate 117 alternatingly couples probe waveform 115 in response to a gate control signal 121, which is generated by gate control signal generator 119.

In one embodiment, probe waveform 115 is an electrical pulse train that has a repetition rate or frequency substantially equal to the repetition rate or frequency of the sample waveform in signal line 109 of sample 105. In one embodiment, sample driver 127 and probe waveform generator 113 are able to generate the sample waveform and probe waveform 115, respectively, with substantially the same, because both sample driver 127 and probe waveform generator 113 are both driven by trigger signal 131 from trigger 129. In another embodiment, trigger 129 is included as part of sample driver 127 and/or waveform generator 113. In yet another embodiment, delay controller 133 is included as part of sample driver 127.

As is known to those skilled in the art, the electrical interaction between tip 103 of cantilever 101 and signal line 109 of sample 105 can be approximated as a plate capacitor with the voltage difference between tip 103 and signal line 109 giving rise to an attractive force F 137. It is observed that the force F 137 is proportional the square of the voltage difference between tip 103 and signal line 109. As a result, the voltage impressed upon tip 103 by probe waveform generator 113 through probe waveform gate 117 generates the corresponding force F 137. In one embodiment, cantilever 101 is configured such that force F 137 results in motion of cantilever 101.

In one embodiment, the sample waveform may be determined using known techniques by monitoring the gradient or higher order derivatives of force F 137. In another embodiment the sample waveform may be determined using known techniques by monitoring the vertical or horizontal forces or force gradients of force F 137.

As discussed above, probe waveform gate 117 alternatingly couples the probe waveform 115 to be received by the tip 103 of cantilever 101 in response to gate control signal 121, which is generated by gate control signal generator 119. In one embodiment, the repetition rate or frequency of gate control signal 121 is substantially less than the repetition rate or frequency of the sample waveform on signal line 109 or probe waveform 115. Thus, gate control signal 121 does not have to be switched at high speed. Accordingly, probe waveform gate 117 in one embodiment is able to pass high bandwidth signals but does not have to be an expensive fast switching gate. In one embodiment, probe waveform gate is implemented with lower cost gates or multiplexors that are readily available.

In one embodiment, the repetition rate or frequency of gate control signal 121 is substantially equal to a mechanical resonance frequency of cantilever 101. In one embodiment, gate control signal 121 is configured to turn probe waveform gate 117 "on" during one portion of the gate control signal 121 cycle, and "off" during the remaining portion of the gate control signal 121 cycle. As such, force F 137 is periodically impressed upon cantilever 101 at a repetition rate equal to the sample waveform and probe waveform 115 during the "on" portion of the gate control signal 121 cycle. During the "off" portion of the gate control signal 121 cycle, the force F 137 impressed upon cantilever 101 is changed.

The differing amounts of force F 137 impressed upon cantilever 101 during the "on" and "off" portions result in motion of cantilever 101 at a frequency equal to the repetition rate of gate control signal 121. The motion or deflection of cantilever 101 is dependent on mechanical properties of cantilever 101 and the magnitude and driving repetition rate of the driving force F137. In one embodiment, motion detector 135 is coupled to cantilever 101 to monitor the motion of cantilever 101 using known techniques. By measuring the motion of cantilever 101, the sample waveform in signal line 109 may be determined at the particular points in time within each cycle of the sample waveform that correspond to the points in time when the pulses of probe waveform 115 were impressed upon tip 103.

In one embodiment, probe waveform generator 113 includes a delay controller 133 that may be used to adjust the delay of probe waveform 115. As a result, the time reference of probe waveform 115 may be adjusted relative to the sample waveform on signal line 109. By adjusting the time reference, the time at which the pulses of probe waveform 115 arrive at tip 103 may be adjusted or shifted in time within each cycle of the sample waveform accordingly. As a result, the presently described non-contact waveform measurement apparatus is able to determine values of the sample waveform on signal line 109 at various instances within the cycle of the sample waveform in accordance with the teachings of the present invention.

Although in the above-described embodiment gate control signal 121 has a repetition rate or frequency substantially equal to the mechanical resonance frequency of cantilever 101, it is noted that gate control signal generator 119 may generate gate control signal 121 at, higher than the mechanical resonance frequency of cantilever 101, such as for example but not limited to the harmonics of the fundamental mechanical resonant frequencies of cantilever 101. In other embodiments, it is noted that the repetition rate of gate control signal 121 may be less than the fundamental frequency of cantilever 101 down to DC values.

Figure 2:
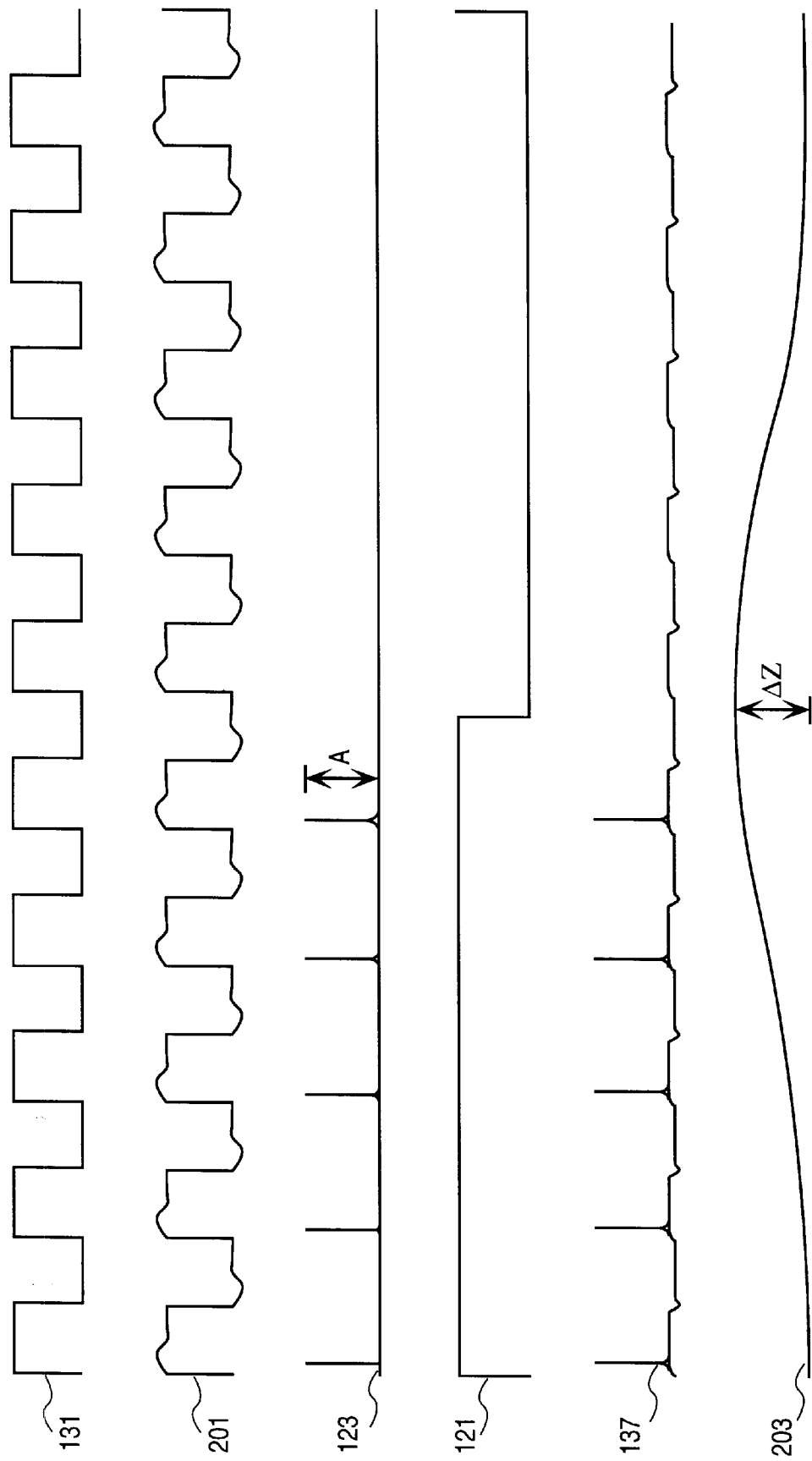
FIG. 2 is a timing diagram showing various waveforms associated with one embodiment of a non-contact waveform measurement apparatus in accordance with the teachings of the present invention.

FIG. 2 is a timing diagram illustrating the relationship of the various waveforms associated with the non-contact waveform measurement apparatus in accordance with the teachings of the present invention. In particular, FIG. 2 shows one embodiment of a trigger signal 131 in relation to a sample waveform 201, which in one embodiment is the sample waveform carried in signal line 109 of FIG. 1. As shown in FIG. 2, trigger signal 131 and sample waveform 201 have substantially the same repetition rate. FIG. 2 also shows probe signal 123 in relation to trigger signal 131 and sample waveform 201. In one embodiment, probe signal 123 includes an electrical pulse train having a repetition rate also substantially equal to trigger signal 131 and sample waveform 201.

As also shown in FIG. 2, the pulses of the electrical pulse train of probe signal 123 are impressed upon tip 103 during a "on" portion of a cycle of gate control signal 121. In one embodiment, "on" and "off" conditions of gate control signal 121 are "high" and "low" conditions, respectively. It is appreciated that in another embodiment, "on" and "off" conditions of gate control signal 121 may be "low" and "high" conditions, respectively.

Since the pulses within probe signal 123 has the same repetition rate as sample waveform 201, each pulse of probe signal 123 is impressed upon tip 103 of cantilever 101 at the same point in time within each cycle of sample waveform 201 during the "on" portion of gate control signal 121. Accordingly, the force F 137 is shown in FIG. 2 to be a plurality of pulses that are impressed upon cantilever 101 at the sample waveform repetition rate during the "on" portion of the gate control signal 121 cycle. As shown in FIG. 2, the force F 137 during the "off" portions of the gate control signal 121 cycle are different than the force F 137 during the "on" portion.

Cantilever 101 is displaced varying amounts as a result of the varying forces F 137 over time. The motion of cantilever 101 is shown as •Z in the motion waveform 203 of FIG. 2. In one embodiment, •Z is proportional to the voltage of sample waveform 201 at the time at which the electrical pulses of probe signal 123 are impressed upon tip 103 of cantilever 101.

Figure 3:
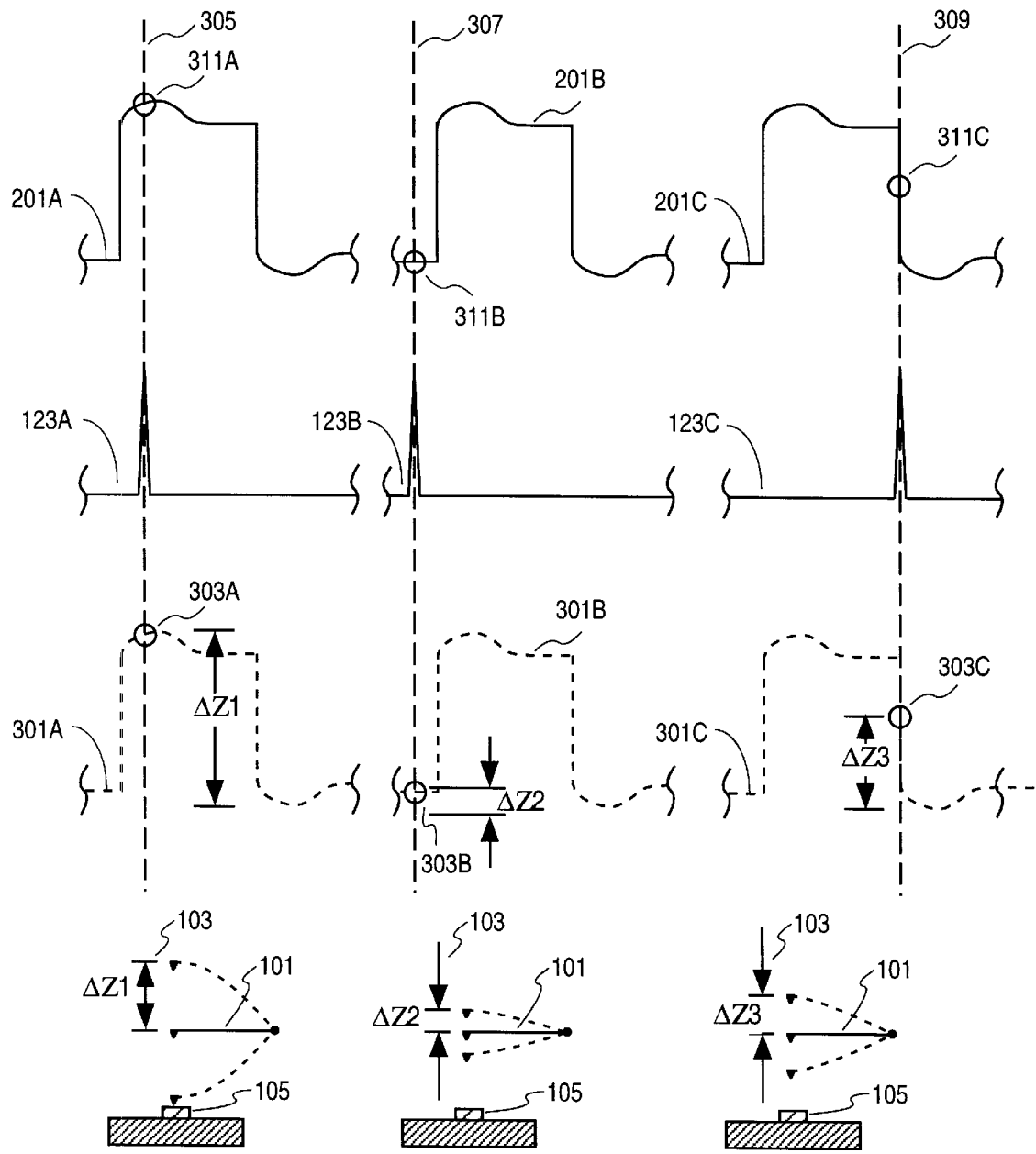
FIG. 3 is a timing diagram showing various waveforms associated with one embodiment of the present invention that further illustrate the principle of operation of one embodiment of a non-contact waveform measurement apparatus in accordance with the teachings of the present invention.

By adjusting the time delay of probe waveform 115, thereby adjusting the time delay of probe signal 123, •Z may be determined at various locations within each cycle of sample waveform 201. As a result, sample waveform 201 can be reconstructed in accordance with the teachings of the present invention. In particular, FIG. 3 is a detailed timing diagram that shows sample waveform 201 in relation to probe waveform 123 with various settings for delay controller 133. As a result, the pulses of probe signal 123 are adjusted or shifted to occur during various points within each cycle of sample waveform 201

To illustrate, dashed line 305 of FIG. 3 shows that cantilever 101 is displaced in amplitude •Z1 relative to sample 105 with the pulse of probe signal 123A occurring at the time corresponding to location 311A in sample waveform 201 A. Accordingly, a reconstructed waveform value 303A is determined for reconstructed waveform 301 A.

Similarly, dashed line 307 shows that cantilever 101 is displaced in amplitude •Z2 relative to sample 105 with the pulse of probe signal 123B being impressed upon the tip of cantilever 101 at the time corresponding to location 311B in sample waveform 201B. Accordingly, reconstructed waveform value 303B is determined for reconstructed waveform 301B.

Dashed line 309 of FIG. 3 also shows that cantilever 101 is displaced an amplitude of •Z3 relative to sample 105 when the pulse of probe signal 123C arrives at the tip 103 of cantilever 101 at the time corresponding to location 311C in sample waveform 201C. Accordingly, reconstructed waveform value 303C is determined for reconstructed waveform 301C.

Thus, after determining reconstructed values 303A, 303B, 303C, etc., the sample waveform in sample 105 may be determined in accordance with the teachings of the present invention without coming in direct contact with sample 105.

In one embodiment, a non-contact waveform measurement apparatus in accordance with the teachings of the present invention may be used to obtain accurate timing and amplitude information without complex calibration or precise cantilever positioning. In addition, the procedure does not require accurate information about the cantilever mechanical properties and cantilever capacitance. In particular, the amplitude A of probe signal 123 as shown in FIG. 2 is adjusted to nullify the force F 137.

Figure 4:
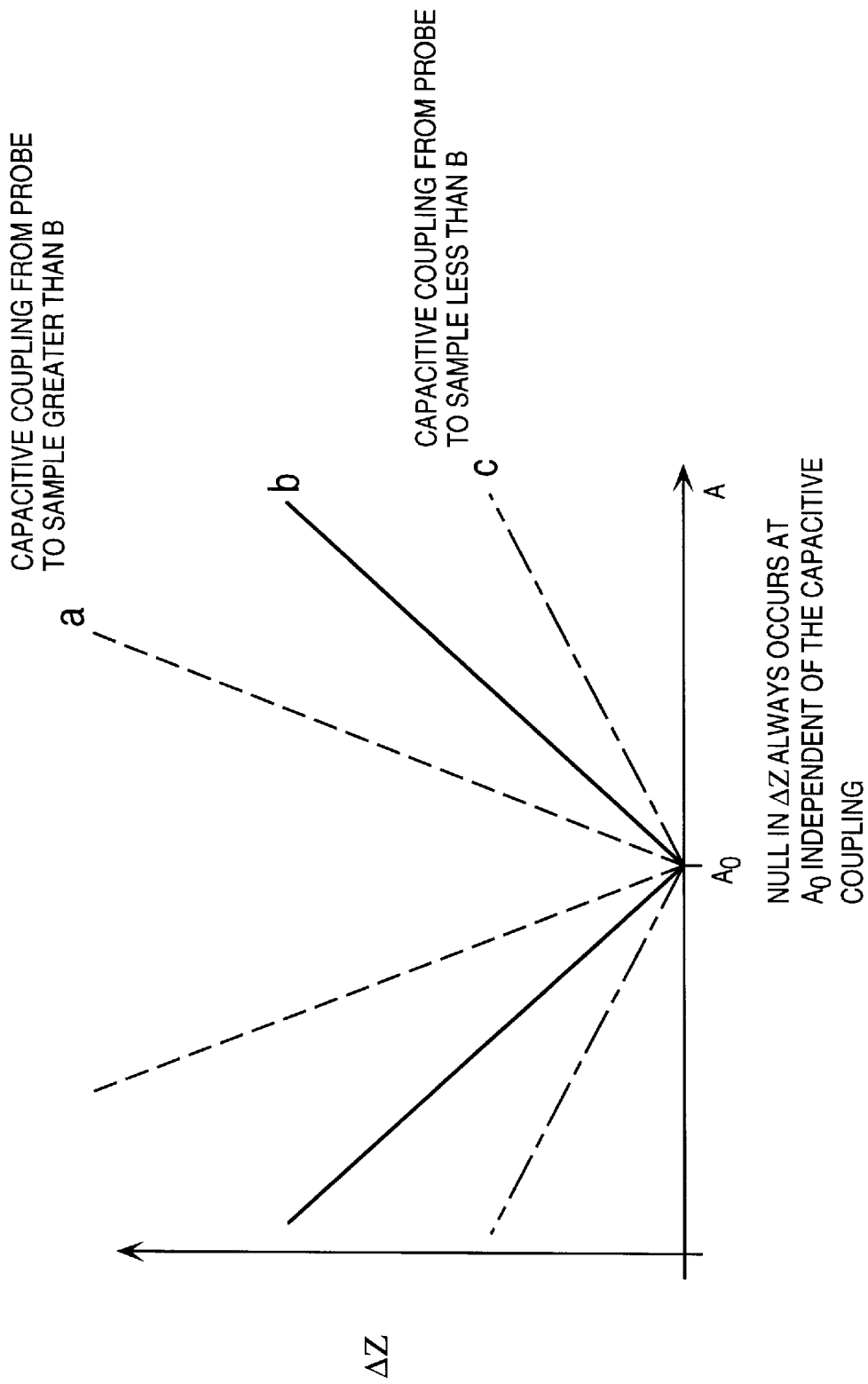
FIG. 4 is a diagram showing the relationship of motion of the cantilever in relation to the pulse amplitude of the probe waveform in one embodiment of a non-contact waveform measurement apparatus in accordance with the teachings of the present invention.

Assuming the amplitude A of probe signal 123 is a variable parameter, the relationship of A versus •Z of motion waveform 203 is shown in FIG. 4. Motion of cantilever 101 is generated when there is a difference in force between the first and second halves of the cycle of gate control signal 121. If the force during the second half of the cycle is equal to the force during the first half of the cycle, there will be no net motion of cantilever 101 and •Z will therefore be equal to zero. This nullification of force occurs when the pulse amplitude A of probe signal 123 is as far above the sample voltage as the pulse base line voltage is below it. Thus, neglecting the DC offset terms, •Z equals zero when A is equal $A_0$ shown in FIG. 4, which is equal to twice the voltage of sample waveform 201 at the sampling time. As shown in FIG. 4, the relationship of •Z being equal to zero when A is equal $A_0$ is independent of the magnitude of the capacitance coupling between cantilever 101 and signal line 109.

Figure 5:
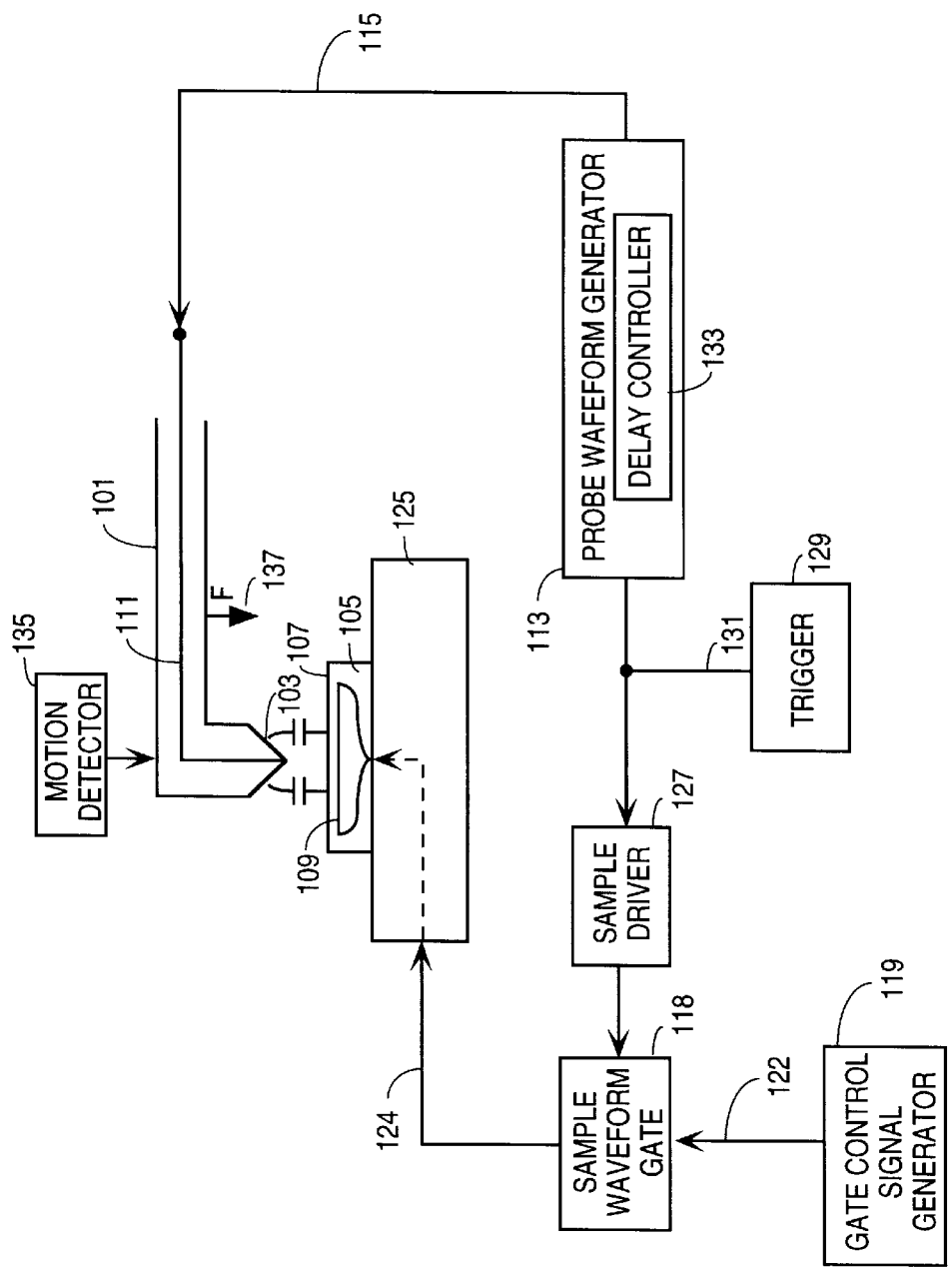
FIG. 5 is a block diagram of another embodiment of a non-contact waveform measurement apparatus in accordance with the teachings of the present invention.

FIG. 5 is a block diagram of another embodiment of a non-contact waveform measurement apparatus in accordance with the teachings of the present invention. As shown in FIG. 5, sample 105 is mounted on a stage 125. In one embodiment, sample driver 127 drives a periodic sample waveform on a signal line 109 though a sample waveform gate 118. In one embodiment, sample waveform gate 118 periodically couples signal line 109 to sample driver 127. In such an embodiment, sample waveform gate 118 alternatingly couples signal line 109 to sample driver 127 in response to a sample waveform enable signal 122, which is generated by gate control signal generator 119. Thus, the sample waveform on signal line 109 is alternatingly enabled or activated in response to sample waveform enable signal 122. Trigger 129 generates a trigger 131, which is used by sample driver 127 when driving the sample waveform in signal line 109.

In one embodiment, a probe waveform generator 113 generates a probe waveform 115 that is coupled to tip 103 of cantilever 101 through a signal path 111. In one embodiment, probe waveform 115 is an electrical pulse train that has a repetition rate or frequency substantially equal to the repetition rate or frequency of the sample waveform driven in signal line 109 of sample 105. In one embodiment, sample driver 127 and probe waveform generator 113 are able to generate the sample waveform and probe waveform 115, respectively, with substantially the same repetition rates because both sample driver 127 and probe waveform generator 113 are both driven by trigger signal 131 from trigger 129.

Motion detector 135 is coupled to cantilever 101 to measure the motion of cantilever 101 resulting from force F 137 caused by the voltage of the capacitive coupling between tip 103 and signal line 109, similar to the embodiment discussed above with respect to FIG. 1. To adjust the time delay of probe waveform 115, probe waveform generator 113 includes delay controller 133. As shown in FIG. 5, probe waveform generator 113 is coupled to receive trigger signal 131 such that probe waveform 115 has a repetition rate or frequency substantially equal to trigger signal 131 as well as the repetition rate of the sample waveform on signal line 109 driver by sample driver 127.

In one embodiment, the repetition rate or frequency of sample waveform enable signal 122 is substantially equal to a mechanical resonance frequency of cantilever 101. In one embodiment, sample waveform enable signal 122 is configured to switch sample waveform gate 118 "on" during one portion of the sample waveform enable signal 122 cycle, and "off" during the remaining portion of the sample waveform enable signal 122 cycle. Similar to the embodiment discussed above in connection with FIG. 1, force F 137 is periodically impressed upon cantilever 101 at a repetition rate equal to the sample waveform and probe waveform 115 during the "on" portion of the sample waveform enable signal 122 cycle. In one embodiment, during the "off" portion of the sample waveform enable signal 122 cycle, the force F 137 impressed upon cantilever 101 is changed such that the motion of cantilever 101 is correspondingly changed.

The varying amounts of force F 137 impressed upon cantilever 101 result in a motion of cantilever 101. The motion or deflection of cantilever 101 is proportional to mechanical properties of cantilever 101 and the magnitude and driving repetition rate of the driving force F 137. In one embodiment, motion detector 135 is coupled to cantilever 101 to monitor the motion of cantilever 101 using known techniques. By measuring the motion of cantilever 101, the sample waveform in signal line 109 may be determined at the particular points in time within each cycle of the sample waveform that correspond to the points in time when the pulses of probe waveform 115 were impressed upon tip 103.

Figure 6:
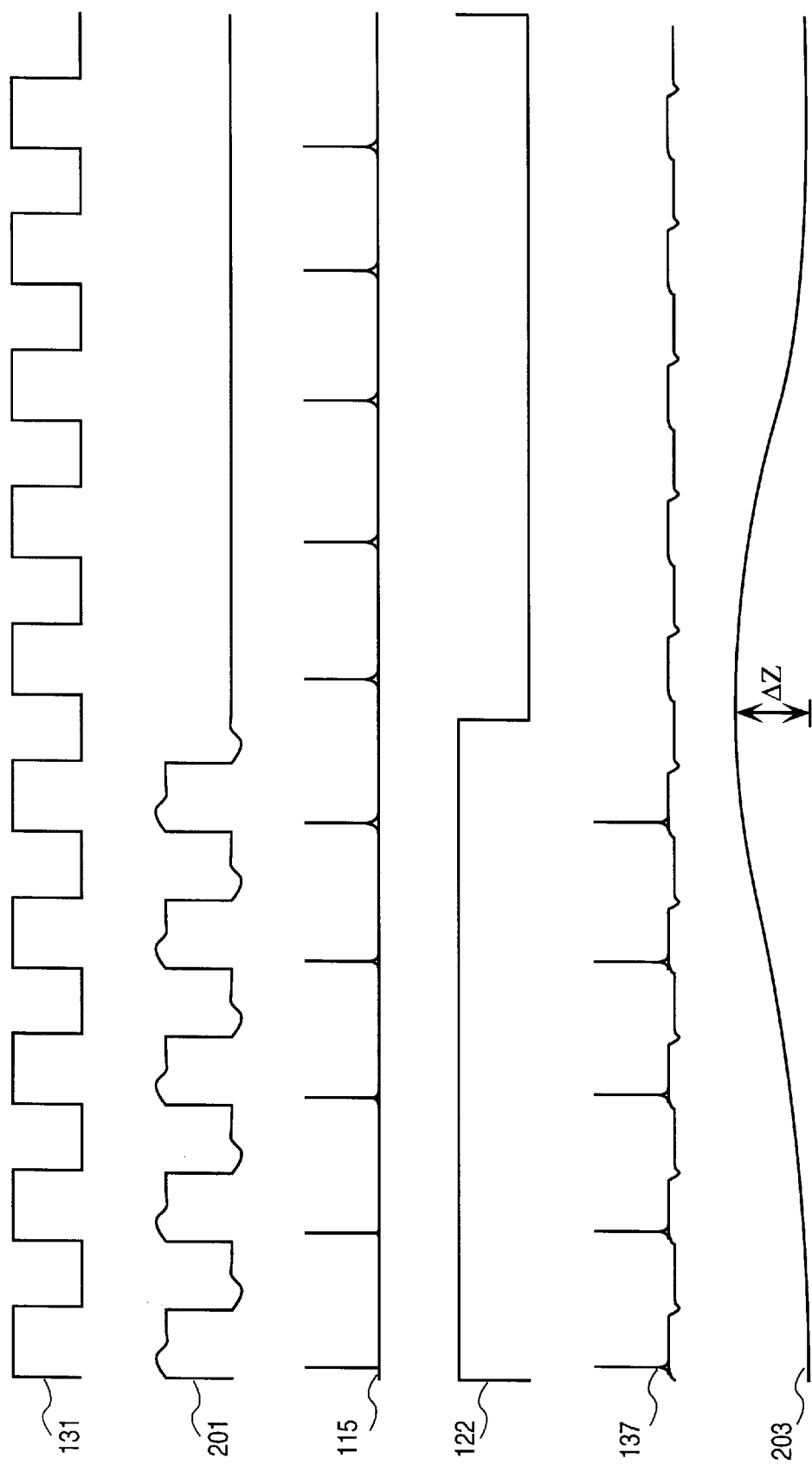
FIG. 6 is a timing diagram showing various waveforms associated with another embodiment of a non-contact waveform measurement apparatus in accordance with the teachings of the present invention.

FIG. 6 is a timing diagram illustrating the relationship of the various waveforms associated with the non-contact waveform measurement apparatus of FIG. 5 in accordance with the teachings of the present invention. In particular, FIG. 6 shows one embodiment of a trigger signal 131 in relation to a sample waveform 201, which in one embodiment is the sample waveform carried in signal line 109 of FIG. 5. As shown in FIG. 6, trigger signal 131 and sample waveform 201 have substantially the same repetition rate. FIG. 6 also shows probe waveform 115 in relation to trigger signal 131 and sample waveform 201. In one embodiment, probe waveform 115 includes an electrical pulse train having a repetition rate also substantially equal to trigger signal 131 and sample waveform 201.

As also shown in FIG. 6, the pulses of sample waveform 201 are impressed upon tip 103 during an "on" portion of a cycle of sample waveform enable signal 122. In one embodiment, "on" and "off" conditions of sample waveform enable signal 122 are "high" and "low" conditions, respectively. It is appreciated that in another embodiment, "on" and "off" conditions of sample waveform enable signal 122 may be "low" and "high" conditions, respectively.

Since the pulses within probe waveform 115 have the same repetition rate as sample waveform 201, each pulse of probe waveform is impressed upon tip 103 of cantilever 101 at the same point in time within each cycle of sample waveform 201 during the "on" portion of sample waveform enable signal 122. Accordingly, the force F 137 is shown in FIG. 6 to be a plurality of pulses that are impressed upon cantilever 101 at the sample waveform repetition rate during the "on" portion of the sample waveform enable signal 122 cycle. As shown in FIG. 6, the force F 137 during the "off" portions of the sample waveform enable signal 122 cycle are different than the force F 137 during the "on" portion.

Cantilever 101 is displaced varying amounts as a result of the varying forces F 137 over time. The motion of cantilever 101 is shown as •Z in the motion waveform 203 of FIG. 6. In one embodiment, •Z is proportional to the voltage of sample waveform 201 at the time at which the electrical pulses of probe signal 123 are impressed upon tip 103 of cantilever 101.

Figure 7:
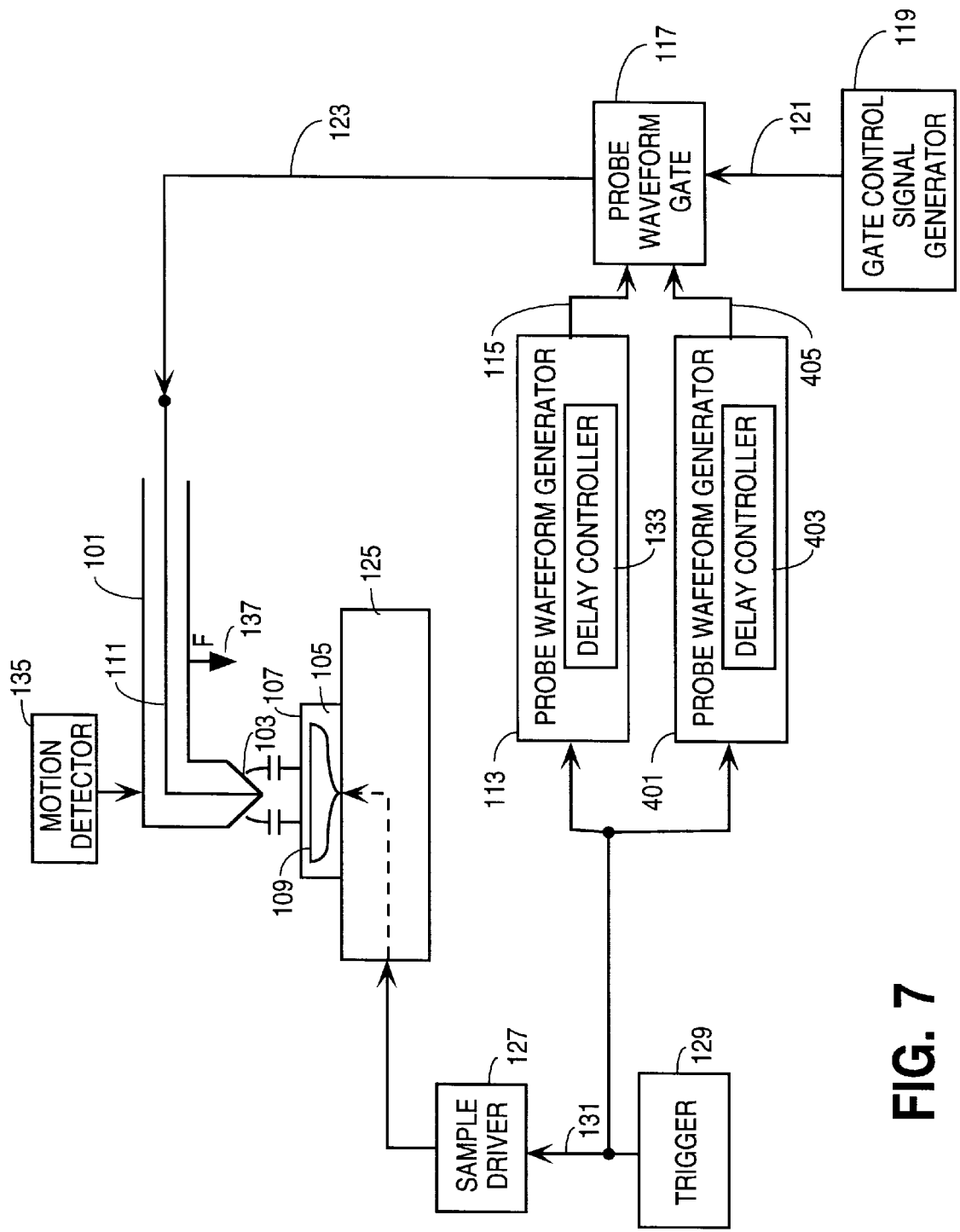
FIG. 7 is a block diagram of yet another embodiment of a non-contact waveform measurement apparatus in accordance with the teachings of the present invention.

FIG. 7 is a block diagram of another embodiment of a non-contact waveform measurement apparatus utilizing a plurality of N probe waveform generators in accordance with the teachings of the present invention. As shown in FIG. 7, a sample 105 is mounted on a stage 125 with a sample driver 127 driving a sample waveform on signal line 109 proximate to a surface 107 of sample 105. Trigger 129 generates a trigger signal 131 used by sample driver 127 to drive the sample waveform in signal line 109. In one embodiment, a cantilever 101 having a tip 103 is disposed near and spaced apart from the surface 107 of sample 105. Tip 103 of cantilever 101 is coupled to probe waveform gate 117 through signal path 111.

In the embodiment shown in FIG. 7, a plurality of two (N equals two) probe waveform generators are utilized. In particular, a first probe waveform generator 113 and a second probe waveform generator 401 are coupled to probe waveform gate 117. Probe waveform generator 113 generates probe waveform 115 and probe waveform generator 401 generates probe waveform 405. Probe waveform gate 117 is also coupled to receive a gate control signal 121 generated by a gate control signal generator 119. In one embodiment, probe waveform gate 117 generates probe signal 123 in response to probe waveform 115, probe waveform 405 and gate control signal 121.

Motion detector 135 is coupled to cantilever 101 to measure the motion of cantilever 101 resulting from force F 137 caused by the voltage of the capacitive coupling between tip 103 and signal line 109, similar to the embodiment discussed above with respect to FIG. 1. To adjust the time delay of probe waveform 115, probe waveform generator 113 includes delay controller 133. To adjust the time delay of probe waveform 405, probe waveform generator 401 includes delay controller 403. As shown in FIG. 7, probe waveform generator 113 and probe waveform generator 401 are each coupled to receive trigger signal 131 such that both probe waveform 115 and probe waveform 405 have a repetition rate or frequency substantially equal to trigger signal 131 as well as the repetition rate of the sample waveform driven by sample driver 127 on signal line 109.

In one embodiment, probe waveform gate 117 uses known techniques to combine probe waveform 115 and probe waveform 405 during the "on" portion of each cycle of gate control signal 121. For instance, in one embodiment, probe waveforms 115 and 405 are summed using known techniques. In that embodiment, the resulting probe signal 123 is similar to the probe signal 123 illustrated in FIG. 2 above insofar as the pulses of probe signal 123 shown in FIG. 2 occur during the corresponding "on" and "off" portions of each cycle of gate control signal 121.

In another embodiment, probe waveform gate 117 alternatingly couples probe signal 115 and probe signal 405 to tip 103 in response gate control signal 121. In one embodiment, probe waveform gate 117 includes a multiplexor switching between probe signal 115 and probe signal 405 with gate control signal 121 acting as a select signal. Similar to the embodiments described above, the electrical pulses impressed upon tip 103 during each "on" portion of each cycle of gate control signal 121 differ from the electrical pulses that are impressed upon tip 103 during each "off" portion of each cycle of gate control signal 121. The motion •Z of cantilever 101 is measured by motion detector 135 to determine the voltage of the sample waveform in signal line 109 during the corresponding portion of the cycle of the sample waveform.

Figure 8:
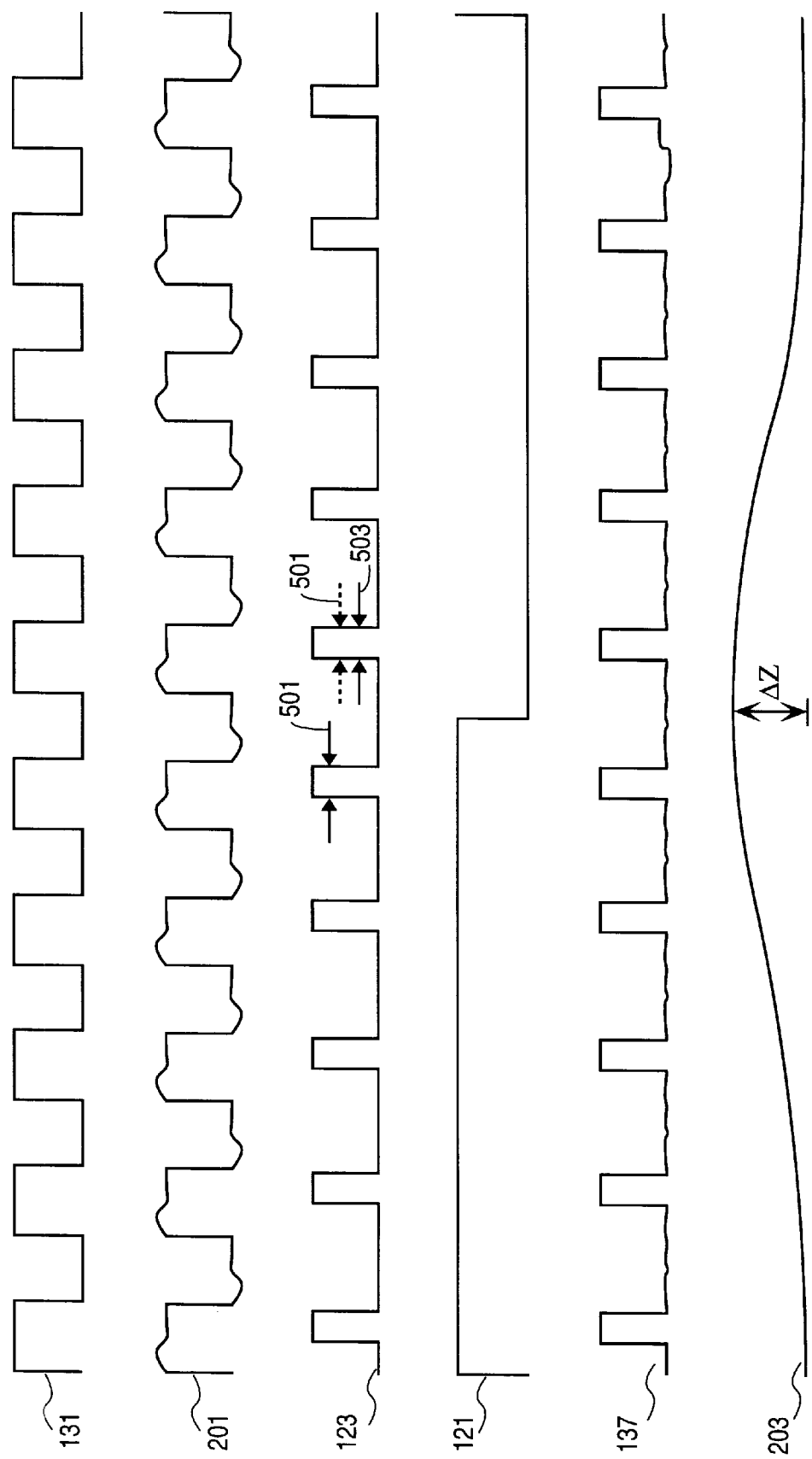
FIG. 8 is a timing diagram showing various waveforms associated with another embodiment of a non-contact waveform measurement apparatus in accordance with the teachings of the present invention.

To illustrate, FIG. 8 shows a timing diagram of an example of waveforms that correspond to one embodiment of the present invention illustrated in FIG. 7. As shown in FIG. 8, trigger signal 131, sample waveform 201, which is carried by signal line 109, and probe signal 123 all have substantially the same repetition rate or frequency. In one embodiment, the width of each pulse of probe signal 123 during the "on" portion of each cycle of gate control signal 121 is shown as pulse width 501. During the "off" portion of the cycle of gate control signal 121, the width of each pulse of probe signal 123 is shown as pulse width 503. In one embodiment, pulse width 503 is less than then pulse width 501. In one embodiment, probe waveform 115 has pulse width 501 and probe waveform 405 has pulse width 503.

In the embodiment illustrated in FIG. 7 and FIG. 8, probe waveform gate 117 toggles between probe waveform 115 and probe waveform 405 in response to gate control signal 121 to generate probe signal 123. Accordingly, force F 137 is impressed upon cantilever 101 as shown in FIG. 8. Since pulse width 503 is different than pulse width 501, the width of each force pulse during the "off" portion of each cycle of gate control signal 121 is different from the width of each force pulse during the "on" portion. Accordingly, the motion 203 varies as shown in FIG. 8 and the motion, •Z, may be measured to determine the value of sample waveform 201 during the corresponding portion of the cycle of sample waveform 201 in accordance with the teachings of the present invention.

Figure 9:
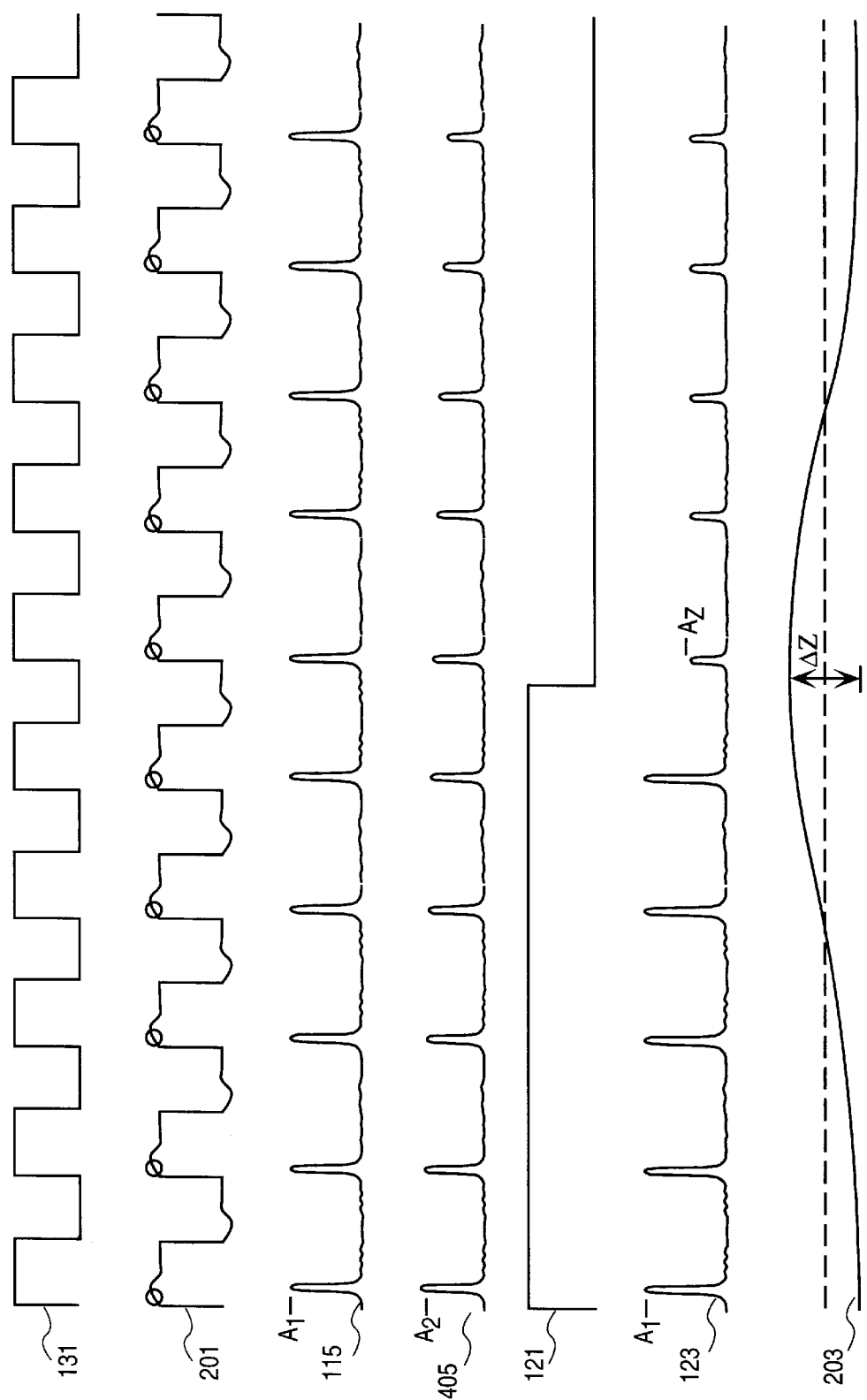
FIG. 9 is a timing diagram showing various waveforms associated with yet another embodiment of a non-contact waveform measurement apparatus in accordance with the teachings of the present invention.

Making use of the effect illustrated in FIG. 4, FIG. 9 shows a timing diagram of example of waveforms that correspond to another embodiment of the present invention as illustrated in FIG. 7. In the embodiment, probe waveform 115 has an amplitude of $A_1$ and probe waveform 405 has an amplitude of $A_2$ such that probe signal 123 is generated as illustrated. As shown in FIG. 9, trigger signal 131, sample waveform 201, which is carried by signal line 109, and probe signal 123 all have substantially the same repetition rate or frequency. In one embodiment, the amplitude of each pulse of probe signal 123 during the "on" portion of each cycle of gate control signal 121 is $A_1$. During the "off" portion of the cycle of gate control signal 121, the amplitude of each pulse of probe signal 123 is $A_2$. In one embodiment, $A_2$ is different than $A_1$. In one embodiment, the average value of $A_1$ and $A_2$, which is $(A_1+A_2)/2$, is adjusted so that the deflection •Z of the motion 203 of cantilever 101 is minimized or nulled. In FIG. 9, this aspect of the present invention is illustrated as motion 203 changing from the solid line to the dashed line. When the deflection •Z of the motion 203 of cantilever 101 is nulled, the sample waveform 201 voltage value at the time instance of the pulse can be determined, which in one embodiment is $(A_1+A_2)/2$.

Figure 10:
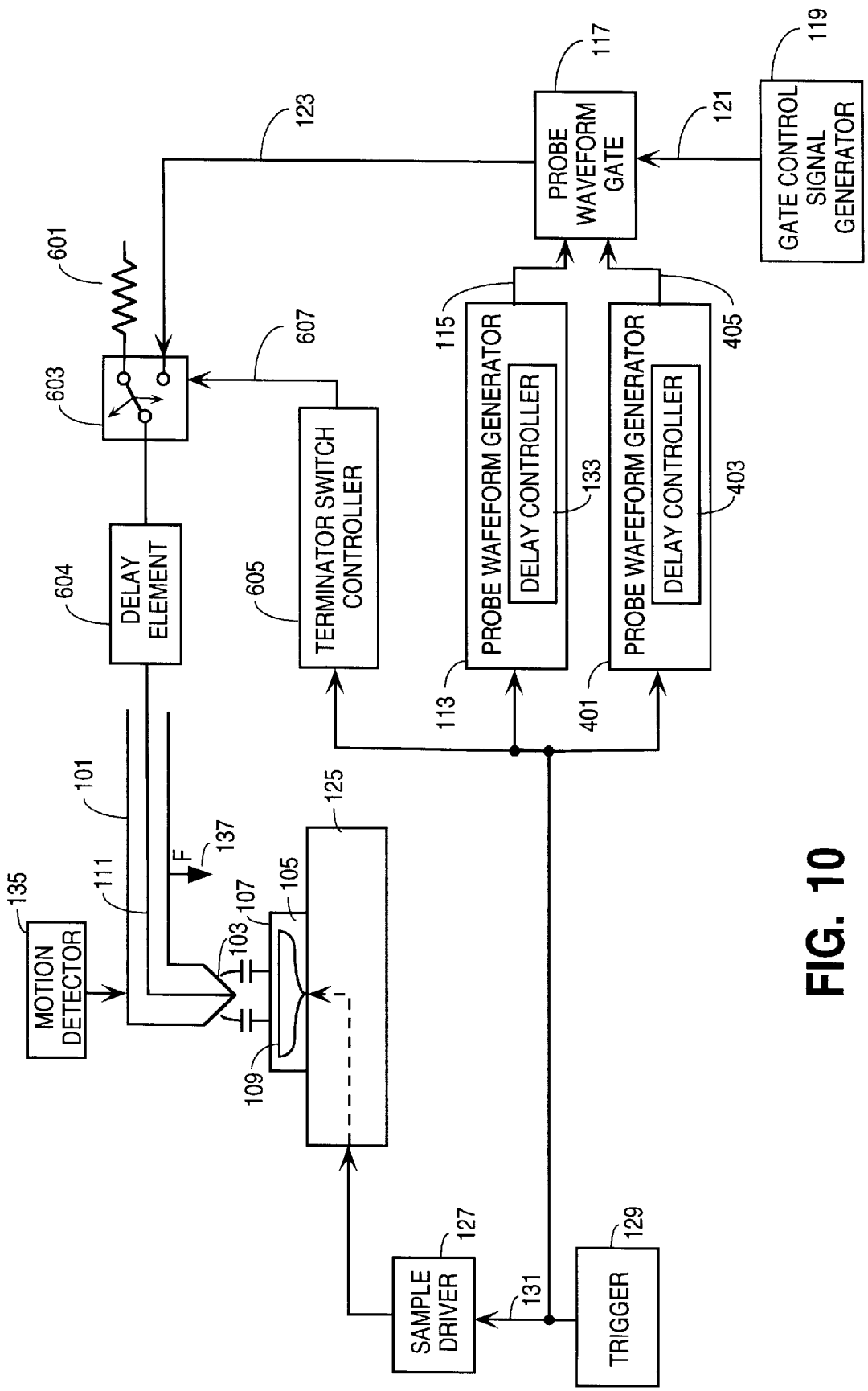
FIG. 10 is a block diagram of still another embodiment of a non-contact waveform measurement apparatus in accordance with the teachings of the present invention.

FIG. 10 is a block diagram illustrating yet another embodiment of a non-contact waveform measurement apparatus in accordance with the teachings of the present invention. As shown in FIG. 10, a sample 105 is mounted on a stage 125 with a sample driver 127 driving a sample waveform in signal line 109 proximate to a surface 107 of sample 105. Sample driver 127 is coupled to receive a trigger signal 131 from trigger 129, which is used when driving the sample waveform in signal line 109. A cantilever 101 having a tip 103 is disposed near and separated from surface 107. The tip 103 of cantilever 101 is coupled to probe waveform gate 117 through a signal path 111.

Probe waveform gate 117 is also coupled to receive a gate control signal 121 generated by gate control signal generator 119, a first probe waveform generated by a first probe waveform generator 113 and a second probe waveform 405 generated by a second probe waveform generator 401. Probe waveform generator 113 includes delay controller 133 to adjust the time delay of probe waveform 115. Probe waveform generator 401 includes delay controller 403 to adjust the time delay of probe waveform 405. Probe waveform generators 113 and 401 are each coupled to receive trigger signal 131.

In one embodiment, probe waveform 115, probe waveform 405 and the sample waveform, which is driven by sample driver 127 in signal line 109, each have repetition rates or frequencies that are substantially equal. In one embodiment, gate control signal 121 of gate control signal generator 119 has a repetition rate or frequency that is substantially less than the repetition rate or frequency of the sample waveform, and the first and second probe waveforms 115 and 405.

A motion detector 135 is coupled to cantilever 101 to monitor motion and measure a motion of cantilever 101 resulting from a force F 137 which is caused by the voltage of the capacitive coupling between tip 103 and signal line 109 in accordance with the teachings of the present invention.

As illustrated in the embodiment shown in FIG. 10, a terminator switch 603 is configured to alternatingly couple tip 103 through a delay element 604 and through signal path 111 to either probe waveform gate 117 or a terminator 601. In one embodiment, terminator 601 has a termination impedance substantially equal to the line impedance of signal path 111. In one embodiment, terminator switch 603 switches between terminator 601 and probe waveform gate 117 in response to terminator switch control signal 607, which is generated by terminator switch controller 605. In one embodiment, terminator switch controller 605 is also coupled to receive trigger signal 131. Accordingly, terminator switch control signal 607 also has a repetition rate or frequency substantially equal to the repetition rate of probe waveforms 115 and 405.

In one embodiment, it is noted that tip 103 has the electrical characteristics of an open circuit in signal path 111. Consequently, electrical pulses that are impressed upon tip 103 are reflected, which may result in unwanted noise, reflections, ringing and the like, in signal line 111. In one embodiment, probe signal 123 may be conditioned or time domain filtered using terminator switch 603, delay element 604 and terminator 601. As a result, reflections of probe signal 123 from tip 103 may be reduced, undesired portions of probe signal 123 may be truncated and other unwanted ringing and/or non-idealities may be reduced in probe signal 123.

For instance, in one embodiment, delay element 604 is adjusted so that the undesired reflected signal and the desired probe signal 123 do not reach terminator switch 603 at the same time. Terminator switch 603 is synchronized with the pulses of probe signal 123 such that terminator switch 603 passes the desired pulses of probe signal 123 to tip 103. Terminator switch 603 switches from probe waveform gate 117 back to terminator 601 when the desired pulses of probe signal 123 are not being passed. Since terminator 601 has a termination impedance substantially equal to the line impedance of signal path 111, the undesired reflections from tip 103 are reduced, thereby reducing the unwanted noise and reflections in signal path 111. With reduced noise in signal path 111, the signal-to-noise ratio of the presently described non-contact waveform measurement apparatus is improved.

Figure 11:
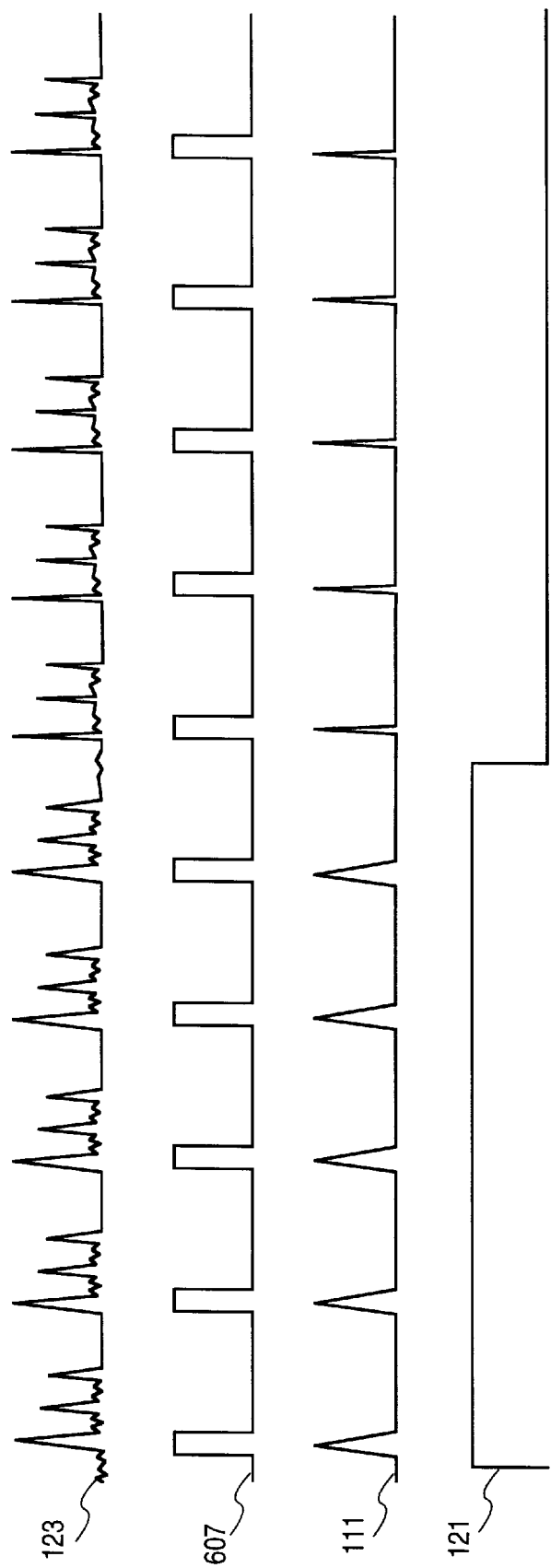
FIG. 11 is a timing diagram showing various waveforms associated with another embodiment of a non-contact waveform measurement apparatus in accordance with the teachings of the present invention.

FIG. 11 is a timing diagram illustrating example waveforms that show the benefits of terminator switch 603 of FIG. 10 in accordance with the teachings of the present invention. As shown in FIG. 11, waveform 123 is an illustration of probe signal 123 with the presence of unwanted reflections following each pulse of probe signal 123. Delay element 604 is adjusted properly as discussed above and terminator switch control signal 607 is shown to be synchronized with the pulses of probe signal 123 such that the desired pulses of probe signal 123 are allowed to pass through terminator switch 603. It is appreciated that when the desired electrical pulses of probe signal 123 are not being passed through terminator switch 603, signal path 111 is coupled to terminator 601, which is impedance matched with signal path 111 and reflections are thereby reduced. Accordingly, the pulses in signal path 111 are shown in FIG. 11 in contrast to probe signal 123, which includes the unwanted reflections. Gate control signal 121 is also shown in FIG. 11 illustrating how the waveforms of probe signal 123 differ between the "on" and "off" portions of each cycle of the gate control signal 121.

Therefore a non-contact waveform measurement apparatus for measuring periodic electrical signal waveforms on or near the surface of a sample is realized. In the foregoing detailed description, the method and apparatus of the present invention has been described with reference to specific exemplary embodiments thereof. It will, however, be evident that various modifications and changes may be made thereto without departing from the broader spirit and scope of the present invention The present specification and figures are accordingly to be regarded as illustrative rather than restrictive.

What is claimed is:

1. An apparatus for measuring a sample waveform in a signal line proximate to a surface of a sample, the sample waveform having a sample repetition rate, the apparatus comprising:
   a cantilever having a tip disposed near and spaced apart from the surface of the sample such that the tip of the cantilever is capacitively coupled to the signal line;
   a first probe waveform generator generating a first probe waveform having a probe repetition rate substantially equal to the sample repetition rate;
   a probe waveform gate coupled between the probe waveform generator and the tip of the cantilever, the probe waveform gate alternatingly coupling the first probe waveform to the tip of the cantilever through a signal path in response to a gate control signal, the gate control signal having a gate control signal repetition rate substantially less than the sample repetition rate; and
   a motion detector coupled to the cantilever, the motion detector detecting a motion of the cantilever.

2. The apparatus of claim 1 further comprising a second probe waveform generator generating a second probe waveform, the probe waveform gate further coupled between the second probe waveform generator and the tip of the cantilever, the probe waveform gate alternatingly coupling the second probe waveform to the tip of the cantilever through the signal path in response to a probe waveform gate control signal.

3. The apparatus of claim 2 wherein the second probe waveform has the probe repetition rate.

4. The apparatus of claim 2 wherein the second probe waveform comprises a substantially direct current (DC) signal.

5. The apparatus of claim 2 wherein the probe waveform gate concurrently couples and sums the first and second probe waveforms to the tip of the cantilever through the signal path in response to the probe waveform gate control signal.

6. The apparatus of claim 2 wherein the probe waveform gate alternatingly couples the first or second probe waveform to the tip of the cantilever through the signal path in response to the probe waveform gate control signal.

7. The apparatus of claim 1 further comprising:
   a sample driver coupled to the sample, the sample driver driving the sample waveform in the signal line of the sample; and
   a trigger generating a trigger signal having the sample repetition rate, the trigger coupled to the sample driver and the first probe waveform generator, the sample driver driving the sample waveform in response to the trigger signal and the first probe waveform generator generating the first probe waveform in response to the trigger signal.

8. The apparatus of claim 2 further comprising:
   a sample driver coupled to the sample, the sample driver driving the sample waveform in the signal line of the sample; and
   a trigger generating a trigger signal at the sample repetition rate, the trigger coupled to the sample driver, the first probe waveform generator and the second probe waveform generator, the sample driver driving the sample waveform in response to the trigger signal, the first probe waveform generator generating the first probe waveform in response to the trigger signal, and the second probe waveform generator generating the second probe waveform in response to the trigger signal.

9. The apparatus of claim 1 wherein the first probe waveform generator comprises a first delay controller, the first delay controller modulating a time delay difference between the first probe waveform and the sample waveform.

10. The apparatus of claim 2 wherein the first and second probe waveform generators comprise first and second delay controllers, respectively, the first and second delay controllers modulating a time delay difference between the first and second probe waveforms and the sample waveform.

11. The apparatus of claim 7 wherein the sample driver comprises a first delay controller, the first delay controller modulating a time delay difference between the first probe waveform and the sample waveform.

12. The apparatus of claim 8 wherein the sample driver comprises a first delay controller, the first delay controller modulating a time delay difference between the first probe waveform and the sample waveform.

13. The apparatus of claim 1 further comprising:
   a terminator having a termination impedance substantially equal to a line impedance of the signal path;
   a terminator switch controller generating a terminator switch control signal having a repetition rate substantially equal to the probe repetition rate; and
   a terminator switch coupled to the tip of the cantilever, the first probe waveform generator and the terminator switch controller, the terminator switch alternatingly coupling the tip of the cantilever through the signal path to the first probe waveform generator or the terminator in response to the terminal switch control signal.

14. The apparatus of claim 13 further comprising:
   a sample driver coupled to the sample, the sample driver driving the sample waveform in the signal line of the sample; and
   a trigger generating a trigger signal at the sample repetition rate, the trigger coupled to the sample driver, the first probe waveform generator and the terminator switch controller, the sample driver driving the sample waveform in response to the trigger signal, the first probe waveform generator generating the first probe waveform in response to the trigger signal, and the terminator switch controller generating the terminator switch control signal in response to the trigger signal.

15. The apparatus of claim 1 wherein the gate control signal repetition rate is substantially equal to a mechanical resonance frequency of the cantilever.

16. The apparatus of claim 1 wherein the gate control signal repetition rate is substantially equal to a harmonic of a mechanical resonance frequency of the cantilever.

17. A method for measuring a sample waveform in a signal line proximate to a surface of a sample, the sample waveform having a sample repetition rate, the method comprising the steps of:

disposing a tip of a cantilever near and spaced apart from the surface of the sample such that the tip of the cantilever is capacitively coupled to the signal line;

generating a first probe waveform having a probe repetition rate substantially equal to the sample repetition rate;

generating a probe waveform gate control signal having a probe waveform gate control signal repetition rate substantially less than the sample repetition rate;

alternatingly coupling the first probe waveform to the tip of the cantilever through a signal path in response to the gate control signal; and measuring a motion of the cantilever resulting from a voltage difference in the capacitive coupling between the tip of the cantilever and the signal line of the sample.

18. The method of claim 17 including the additional steps of:

generating a second probe waveform; and alternatingly coupling the second probe waveform to the tip of the cantilever through a signal path in response to the probe waveform gate control signal.

19. The method of claim 18 wherein the step of generating the second probe waveform includes the step of generating the second probe waveform to have the probe repetition rate.

20. The method of claim 18 wherein the step of generating the second probe waveform includes the step of generating the second probe waveform to comprise a substantially direct current (DC) signal.

21. The method of claim 18 wherein the step of alternatingly coupling the second probe waveform to the tip of the cantilever includes the step of coupling and summing the first and second probe waveforms to the tip of the cantilever through the signal path in response to the probe waveform gate control signal.

22. The method of claim 18 wherein the step of alternatingly coupling the second probe waveform to the tip of the cantilever includes the step of alternatingly coupling the first or second probe waveform to the tip of the cantilever through the signal path in response to the probe waveform gate control signal.

23. The method of claim 17 further comprising the steps of:

generating a trigger signal having the sample repetition rate;

driving the sample waveform in response to the trigger signal; and generating the probe waveform in response to the trigger signal.

24. The method of claim 18 further comprising the steps of:

generating a trigger signal having the sample repetition rate;

driving the sample waveform in response to the trigger signal; and generating the first and second probe waveforms in response to the trigger signal.

25. The method of claim 17 further comprising the step of modulating a time delay difference between the first probe waveform and the sample waveform.

26. The method of claim 18 further comprising the step of modulating a time delay difference between the first and second probe waveforms and the sample waveform.

27. The method of claim 18 further comprising the step of adjusting the first and second probe waveforms such that the motion of the cantilever is nulled.

28. The method of claim 17 further comprising the step of conditioning the first probe waveform in the signal path.

29. The method of claim 28 wherein the step of conditioning the first probe waveform in the signal path include the steps of alternatingly coupling the tip of the cantilever to a terminator having termination impedance substantially equal to a line impedance of the signal path at a repetition rate substantially equal to the probe repetition rate.

30. The method of claim 18 further comprising the step of conditioning the first and second probe waveforms in the signal path.

31. The method of claim 30 wherein the step of conditioning the first and second probe waveforms in the signal path include the steps of alternatingly coupling the tip of the cantilever to a terminator having termination impedance substantially equal to a line impedance of the signal path at a repetition rate substantially equal to the probe repetition rate.

32. The apparatus of claim 17 wherein the probe waveform gate control signal repetition rate is substantially equal to a mechanical resonance frequency of the cantilever.

33. The apparatus of claim 17 wherein the probe waveform gate control signal repetition rate is substantially equal to a harmonic of a mechanical resonance frequency of the cantilever.

34. A method for measuring a sample waveform in a signal line proximate to a surface of a sample, the sample waveform having a sample repetition rate, the method comprising the steps of:

disposing a tip of a cantilever near and spaced apart from the surface of the sample such that the tip of the cantilever is capacitively coupled to the signal line;

generating a first probe waveform having a probe repetition rate substantially equal to the sample repetition rate;

coupling the first probe waveform to the tip of the cantilever through a signal path;

generating a sample waveform enable signal having a sample waveform enable signal repetition rate substantially less than the sample repetition rate;

alternatingly enabling the sample waveform in the signal line in response to the sample waveform enable signal; and measuring a motion of the cantilever resulting from a voltage difference in the capacitive coupling between the tip of the cantilever and the signal line of the sample.

35. The method of claim 34 further comprising the steps of:

generating a trigger signal having the sample repetition rate;

driving the sample waveform in response to the trigger signal and the sample waveform signal; and generating the probe waveform in response to the trigger signal.

36. The method of claim 34 further comprising the step of modulating a time delay difference between the first probe waveform and the sample waveform.

37. The apparatus of claim 34 wherein the sample waveform enable signal repetition rate is substantially equal to a mechanical resonance repetition rate of the cantilever.

38. The apparatus of claim 34 wherein the sample waveform enable signal repetition rate is substantially equal to a harmonic of a mechanical resonance frequency of the cantilever.

\* \* \* \* \*